US011608739B2

United States Patent
(12) United States Patent
Lehr

(10) Patent No.: US 11,608,739 B2
(45) Date of Patent: Mar. 21, 2023

(54) ELECTRICAL IMPULSE EARTH-BORING TOOLS AND RELATED SYSTEMS AND METHODS

(71) Applicant: Baker Hughes Oilfield Operations LLC, Houston, TX (US)

(72) Inventor: Joerg Lehr, Celle (DE)

(73) Assignee: Baker Hughes Oilfield Operations LLC, Houston, TX (US)

( * ) Notice: Subject to any disclaimer, the term of this patent is extended or adjusted under 35 U.S.C. 154(b) by 0 days.

(21) Appl. No.: 16/923,834

(22) Filed: Jul. 8, 2020

(65) Prior Publication Data

US 2021/0010369 A1 Jan. 14, 2021

Related U.S. Application Data

(60) Provisional application No. 62/872,026, filed on Jul. 9, 2019.

(51) Int. Cl.
*E21B 49/00* (2006.01)
*G01V 5/04* (2006.01)
(Continued)

(52) U.S. Cl.
CPC .............. *E21B 49/003* (2013.01); *E21B 7/15* (2013.01); *E21B 10/00* (2013.01); *E21B 41/0085* (2013.01); *G01V 5/04* (2013.01)

(58) Field of Classification Search
CPC .... E21B 49/003; E21B 10/00; E21B 41/0085; E21B 7/15; E21B 47/013; G01V 5/04
See application file for complete search history.

(56) References Cited

U.S. PATENT DOCUMENTS 1,898,926 A * 2/1933 Aarts ........................ E21B 7/15 175/16
4,351,037 A 9/1982 Scherbatskoy
(Continued)

FOREIGN PATENT DOCUMENTS

GB 2476653 A * 7/2011
WO 2011/133530 A4 10/2011

OTHER PUBLICATIONS

Anders et al., "Electric Impulse Drilling: The Future of Drilling Technology Begins Now," ASME 2017 36th International Conference on Ocean, Offshore and Arctic Engineering, vol. 8, (Jun. 25-30, 2017), Paper No. OMAE2017-61105, pp. V008T11A024; 6 pages.
(Continued)

*Primary Examiner* — Jonathan Malikasim
(74) *Attorney, Agent, or Firm* — TraskBritt

(57) ABSTRACT

The downhole tool may include an electrical power source, a positive and a negative electrode, and at least one sensor. The positive and negative electrodes may be configured to generate an electric field between the positive and the negative electrode with an electrical charge from the electrical power source and discharge the electric charge through a downhole formation. The at least one sensor may be configured to detect quantum particles dislocated by at least one of the electric field and the discharged electrical charge to determine downhole information from at least one of a travel time of the quantum particles, a composition of the quantum particles, a quantity of the quantum particles, and a charge of the quantum particles.

16 Claims, 11 Drawing Sheets

100 302 304 104 310 306 102

100 602 102 102 104 604

(51) Int. Cl.

| | |
|---|---|
| ***E21B 41/00*** | (2006.01) |
| ***E21B 7/15*** | (2006.01) |
| ***E21B 10/00*** | (2006.01) |

(56) References Cited

U.S. PATENT DOCUMENTS

| | | | | |
|---|---|---|---|---|
| 4,722,402 | A | 2/1988 | Weldon | |
| 5,193,985 | A * | 3/1993 | Escue | E21B 43/128 166/66 |
| 5,615,172 | A | 3/1997 | Kotlyar | |
| 5,720,355 | A * | 2/1998 | Lamine | E21B 47/024 175/45 |
| 7,784,563 | B2 | 8/2010 | Roedland et al. | |
| 8,479,841 | B2 | 7/2013 | Rosten et al. | |
| 9,027,669 | B2 | 5/2015 | Dirksen | |
| 9,181,754 | B2 | 11/2015 | Donderici et al. | |
| 9,217,287 | B2 | 12/2015 | Comeaux et al. | |
| 10,060,195 | B2 * | 8/2018 | Moeny | E21B 7/15 |
| 10,132,158 | B2 * | 11/2018 | Hay | E21B 47/024 |
| 10,132,955 | B2 | 11/2018 | Donderici et al. | |
| 10,370,903 | B2 * | 8/2019 | Lehr | E21B 7/15 |
| 10,677,040 | B2 * | 6/2020 | Hu | E21B 47/005 |
| 10,823,866 | B2 * | 11/2020 | Stark | E21B 47/017 |
| 10,962,485 | B2 * | 3/2021 | Scoullar | G01N 21/93 |
| 11,180,957 | B2 * | 11/2021 | Ramos | E21B 7/065 |
| 2012/0103693 | A1 | 5/2012 | Jeffryes | |
| 2013/0032399 | A1 * | 2/2013 | Dirksen | E21B 7/067 175/16 |
| 2013/0032404 | A1 | 2/2013 | Donderici et al. | |
| 2013/0333879 | A1 * | 12/2013 | Rasheed | E21B 47/00 166/250.1 |
| 2016/0060961 | A1 | 3/2016 | Dirksen et al. | |
| 2016/0326806 | A1 | 11/2016 | Lund et al. | |
| 2017/0204668 | A1 | 7/2017 | Lehr | |
| 2017/0204669 | A1 * | 7/2017 | Lehr | E21B 7/15 |
| 2017/0218749 | A1 * | 8/2017 | Lee | E21B 47/005 |
| 2017/0321536 | A1 * | 11/2017 | Hay | E21B 47/024 |
| 2018/0148981 | A1 | 5/2018 | Moeny | |
| 2018/0313158 | A1 * | 11/2018 | Gilbrech | E21B 7/15 |

OTHER PUBLICATIONS

Anders et al., "Electric Impulse Technology: Long Run Drilling in Hard Rocks," ASME 2015 34th International Conference on Ocean, Offshore and Arctic Engineering, vol. 10, (May 31-Jun. 5, 2015), Paper No. OMAE2015-41219, pp. V010T11A008; 5 pages.

BINE Information Service, "Electric Impulses Fragment Hard Rock", Detailed Information on Energy Research, Federal Ministry for Economic Affairs and Energy (BMWi), Projektinfo 13/2015, 2015, 4 pages.

Lehr et al., "Electro Impulse Drilling and Innovative Configuration of Advanced Drilling Systems," General Electric Company, (Nov. 13, 2017), 40 pages.

Richter, "Summary of Geothermal Drilling Technologies," EIA Geothermal, (Aug. 2017), 28 pages.

Tobola, "Efficient Electric Impulse Drilling with Embedded look Ahead MWD and LWD Functionality," Patentability Search, DRL4-64093, (Jan. 14, 2019), 18 pages.

Voigt et al., "Electric Impulse Technology: Less Energy, Less Drilling Time, Less Round Trips," Society of Petroleum Engineers, (2016), (available at https://doi.org/10.2118/182197-MS), 2 pages.

International Search Report for International Application No. PCT/US2020/041224, dated Oct. 21, 2020, 4 pages.

International Written Opinion for International Application No. PCT/US2020/041224, dated Oct. 21, 2020, 6 pages.

* cited by examiner

502
TOOL CONTROLS
SENSOR
520
522
500
TRANSMITTER
506
RECEIVER
508
504
RECEIVER
508
TRANSMITTER
506

SENSOR
MODULE
512
SENSOR
520
510
520
COMMUNICATION UNIT
524

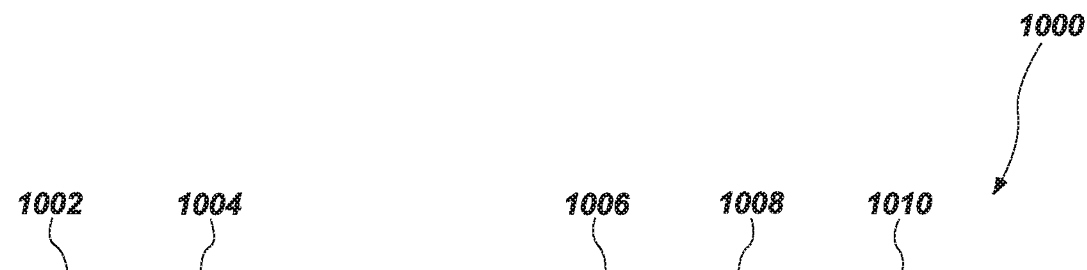

| Element | Decay Type | Number of Protons | Isotope | maximum Quantum Energy [MeV] | γ- Energy [MeV] | Isotope radiation half-life |
|---|---|---|---|---|---|---|
| Hydrogen | $\beta^-$ | 1 | $^{3}H$ | 0,0186 | - | 12,33 Years |
| Carbon | $\beta^+$ | 6 | $^{11}C$ | 0,96 | - | 20,4 Minutes |
| Carbon | $\beta^-$ | 6 | $^{14}C$ | 0,155 | - | 5760 Years |
| Nitrogen | $\beta^+$ | 7 | $^{13}N$ | 1,19 | - | 10 Minutes |
| Oxygen | $\beta^+$ | 8 | $^{15}O$ | 1,73 | - | 2 Minutes |
| Floor | $\beta^+$ | 9 | $^{18}F$ | 0,633 | - | 109,8 Minutes |
| Sodium | $\beta^-$, γ | 11 | $^{24}Na$ | 1,392 | 2,754 | 15,02 Hours |
| Chrom | $e^-$, γ | 24 | 51Cr | 0,315 (e-) | 0,32 | 27,7 Days |
| Cobalt | $\beta^-$, γ | 27 | $^{60}Co$ | 0,318 | 1,33 | 5,272 Years |
| Krypton | $\beta^-$, γ | 36 | $^{85}Kr$ | 0,687 | 0,514 | 10,73 Years |
| Gold | $\beta^-$, γ | 79 | $^{198}Au$ | 0,961 | 0,411 | 2,695 Days |
| Radon | α | 86 | $^{222}Rn$ | 5,489 | - | 3,824 Days |
| Radium | α, γ | 88 | $^{226}Ra$ | 4,784 | 0,186 | 1600 Years |
| Uranium | α, γ | 92 | $^{238}U$ | 4,2 | 0,48 | 4,47 Bill. Years |

*FIG. 10*

ELECTRICAL IMPULSE EARTH-BORING TOOLS AND RELATED SYSTEMS AND METHODS

CROSS-REFERENCE TO RELATED APPLICATION

This application claims the benefit under 35 U.S.C. § 119(e) of U.S. Provisional Patent Application Ser. No. 62/872,026, filed Jul. 9, 2019, the disclosure of which is hereby incorporated herein in its entirety by this reference.

TECHNICAL FIELD

Embodiments of the present disclosure generally relate to earth-boring (e.g., downhole) tools. In particular, to electrical impulse earth-boring tools and related systems and methods.

BACKGROUND

Various earth-boring tools such as rotary drill bits (including roller cone bits and fixed-cutter or drag bits), core bits, eccentric bits, bicenter bits, reamers, and mills are commonly used in forming bore holes or wells in earth formations. These earth-boring tools generally remove material downhole using abrasive or hard surfaces that make contact with the downhole formation cutting and eroding material from the formation and subsequently removing the material from the wellbore.

For example, fixed-cutter bits (often referred to as "drag" bits) have a plurality of cutting elements affixed or otherwise secured to a face (i.e., a formation-engaging surface) of a bit body. Cutting elements generally include a cutting surface, where the cutting surface is usually formed out of a superabrasive material, such as mutually bound particles of polycrystalline diamond. During a drilling operation, a portion of a cutting edge, which is at least partially defined by the peripheral portion of the cutting surface, is pressed into the formation. As the earth-boring tool moves relative to the formation, the cutting element is dragged across the surface of the formation and the cutting edge of the cutting surface shears away formation material. Such cutting elements are often referred to as "polycrystalline diamond compact" (PDC) cutting elements, or cutters.

Conventional tools generally have a relatively short service life before the tool must be removed from the hole and repaired or replaced. Alternative methods have been explored that may increase the service life of the associated earth-boring tools. Some of these methods include Electrical Impulse Technology (EIT), where pulses of high voltage energy are used to pulverize the formation ahead of the earth-boring tool, and water jetting where high pressure fluids are used to remove material ahead of the earth-boring tool.

BRIEF SUMMARY

Some embodiments may include a downhole tool. The downhole tool may include an electrical power source, a positive and a negative electrode, and at least one sensor. The positive and negative electrodes may be configured to generate an electric field between the positive and the negative electrode with an electrical charge from the electrical power source and discharge the electric charge through a downhole formation. The at least one sensor may be configured to detect quantum particles or information about quantum particles dislocated by at least one of the electric field and the discharged electrical charge to determine downhole information from at least one of a travel time of the quantum particles, a composition of the quantum particles, a quantity of the quantum particles, a change in dimensional space, and a charge of the quantum particles.

Additional embodiments may include an electric impulse drilling system. The drilling system may include a drill string, a bottom hole assembly (BHA), and one or more quantum particle detectors. The BHA may include a motor, a power generator, a high voltage generator, and at least two electrodes. The power generator may be configured to generate electrical power from a rotation of the motor. The high voltage generator may be configured to generate a high voltage from the electrical power generated by the power generator. The at least two electrodes may configured to discharge the high voltage from the high voltage generator through a downhole formation. The one or more quantum particle detectors may be disposed within at least one of the at least two electrodes and configured to interpret quantum particles displaced by the discharge of the high voltage through the downhole formation.

Further embodiments of the present disclosure may include a method of measuring a characteristic of a downhole formation. The method may include providing a high voltage field to at least two electrodes on an earth-boring tool. The method may also include discharging a high voltage pulse from the high voltage field through the downhole formation. The method may further include measuring a feature of quantum particles displaced by the high voltage pulse. The method may also include determining a characteristic of the downhole formation from the feature of the quantum particles.

BRIEF DESCRIPTION OF THE DRAWINGS

While the specification concludes with claims particularly pointing out and distinctly claiming embodiments of the present disclosure, the advantages of embodiments of the disclosure may be more readily ascertained from the following description of embodiments of the disclosure when read in conjunction with the accompanying drawings in which:

FIG. 10 illustrates a table of element properties measureable by sensors according to embodiments of the present disclosure.

DETAILED DESCRIPTION

Figure 1:
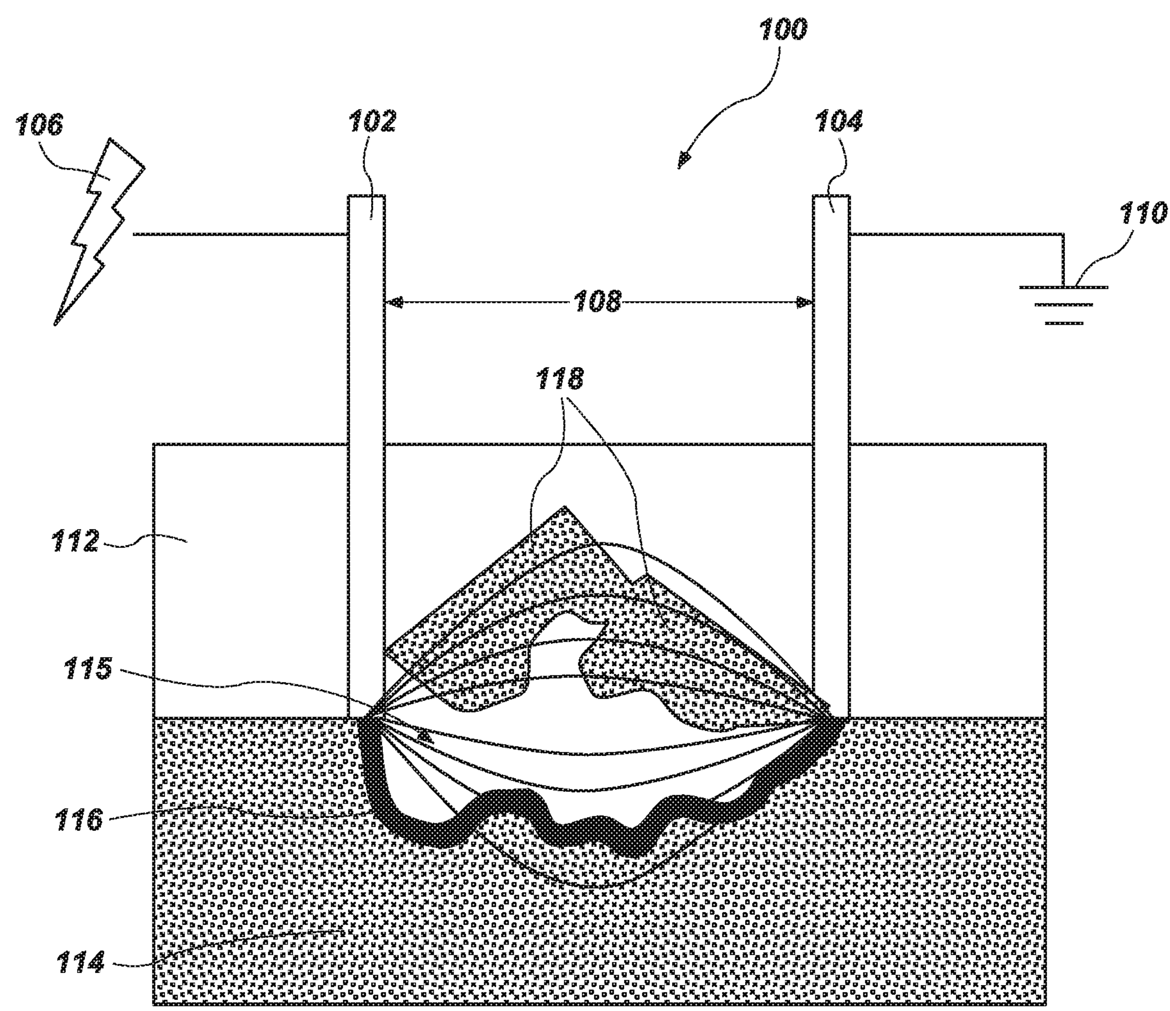
FIG. 1 illustrates a diagrammatic view of an earth-boring tool according to an embodiment of the present disclosure.

The illustrations presented herein are not meant to be actual views of any particular earth-boring tool or component thereof, but are merely idealized representations employed to describe illustrative embodiments. The drawings are not necessarily to scale.

As used herein, the term "substantially" in reference to a given parameter means and includes to a degree that one skilled in the art would understand that the given parameter, property, or condition is met with a small degree of variance, such as within acceptable manufacturing tolerances. For example, a parameter that is substantially met may be at least about 90% met, at least about 95% met, at least about 99% met, or even at least about 100% met.

As used herein, relational terms, such as "first," "second," "top," "bottom," etc., are generally used for clarity and convenience in understanding the disclosure and accompanying drawings and do not connote or depend on any specific preference, orientation, or order, except where the context clearly indicates otherwise.

As used herein, the term "and/or" means and includes any and all combinations of one or more of the associated listed items.

As used herein, the terms "vertical" and "lateral" refer to the orientations as depicted in the figures.

As used herein, the terms "behind" and "ahead" when used in reference to a component of a drill string or bottom hole assembly (BHA) refer to a direction relative to the motion of the component of the drill string. For example, if the component is moving into a borehole, a bottom of the borehole is ahead of the component and the surface and the drill rig are behind the component.

Conventional earth-boring tools generally have a short service life in the range of about 50 hours to about 80 hours. The short service life of conventional earth-boring tools may result from many factors including normal friction wear, the high temperatures and pressures present downhole, the high temperatures at the contact points due to friction, the hard and/or abrasive materials present in downhole formations, etc. Alternative earth-boring tools may reduce one or more of these factors thereby extending the service life of the earth-boring tools.

Electrical Impulse Technology may reduce the amount of contact between the earth-boring tool and the downhole formations by using electrical energy to fracture formation material reducing the amount of friction wear on the drill bit. In some embodiments, downhole sensors may be used, for example, to accurately predict movement of the drill string and/or to provide information about the formation being drilled and other downhole conditions. The electrical energy associated with Electrical Impulse Technology may result in large electric fields. In some embodiments, the large electric fields may interfere with traditional downhole sensors and/or communication systems associated with the downhole sensors. Embodiments of the present disclosure may provide sensors, sensor locations, and/or sensor systems configured to capture downhole information within a large electric field and provide the downhole information to a user while minimizing interference from the large electric field. Some embodiments of the present disclosure may use the large electric field to generate at least a portion of the downhole information.

FIG. 1 illustrates an embodiment of the contact point for an earth-boring tool 100 utilizing electrical impulse technology. The earth-boring tool 100 may include at least two electrodes 102, 104. The at least two electrodes may include at least one positive electrode 102 and at least one negative electrode 104. The at least one positive electrode 102 and the at least one negative electrode 104 may generate an electric field 115 between the positive electrode 102 and negative electrode 104 from electrical energy provided by a power supply 106. The electric field 115 may be sufficient to cause a discharge spark that may jump a gap 108 between the positive electrode 102 and the negative electrode 104. In some embodiments, the negative electrode 104 may be connected to a neutral 110 (e.g., ground). In some embodiments, the neutral 110 may be common with the neutral of the power supply 106.

The downhole environment may include fluids 112, such as water, oil, tar, drilling mud, etc. The fluids 112 may be positioned between the earth-boring tool 100 and a downhole formation 114. In some embodiments, the fluid 112 may be provided through a drill string attached to the earth-boring tool 100. The fluid 112 may be provided with a pressure and flow sufficient to evacuate any loose debris, such as loose material from the formation 114, clearing the path for the earth-boring tool 100. In some embodiments, the fluid 112 may be provided with specific electrical properties. For example, the fluid 112 may have a low electrical conductivity, such as a dielectric fluid, configured to prevent or rapidly quench electrical charges between the positive electrodes 102 and the negative electrodes 104 that are not passing through the formation 114.

When the earth-boring tool 100 advances, the at least one positive electrode 102 and at least one negative electrode 104 may be placed in contact with the formation 114. The at least one positive electrode 102 may then provide an electrical pulse. The electrical pulse may be provided at a sufficient voltage and discharge speed to discharge through the formation 114. For example, the electrical pulse may be provided at a voltage between about 200 kilovolts (kV) and about 900 kV, such as between about 300 kV and about 800 kV, between about 500 kV and about 700 kV, or about 600 kV. The voltage may generate an electric field 115 between the positive electrode 102 and the negative electrode 104 that is greater than about 10,000 kilovolt meters (kVm), such as between about 10,000 kVm and about 100,000 kVm, or between about 10,000 kVm and about 80,000 kVm. The electric field 115 may be generated within a period of time (e.g., have a rise time) of less than about 100 nanoseconds (ns), such as between about 20 ns and about 100 ns or between about 50 ns and about 90 ns.

The electric field 115 may be discharged through a spark that may travel through the formation 114 along a path 116. The spark may generate a plasma in the formation 114 along the path 116. The formation 114 may fracture along the path 116 due to the plasma expansion. The fractured portions 118 of the formation 114 may separate from the formation 114 and be removed. In some embodiments, the fractured portions 118 may be removed from the borehole by the fluid 112 along with other downhole debris. Once the fractured portions 118 are removed the earth-boring tool may move forward placing the electrodes 102, 104 in contact with the formation again. In some embodiments, the earth-boring tool 100 may rotate as the earth-boring tool 100 advances. The electrodes 102, 104 may contact the formation 114 at different rotational positions as the earth-boring tool 100 advances such that a substantially circular hole is formed in the formation.

The earth-boring tool 100 may be configured to remove the fractured portions 118 and other debris to be removed from the borehole. Some embodiments may use an electrode configurations and geometry similar to those described in, for example, U.S. patent application Ser. No. 15/001,715, filed Jan. 20, 2017, and titled “ELECTRIC PULSE DRILLING APPARATUS WITH HOLE CLEANING PASSAGES” the disclosure of which is incorporated herein in its entirety by this reference.

Figure 2:
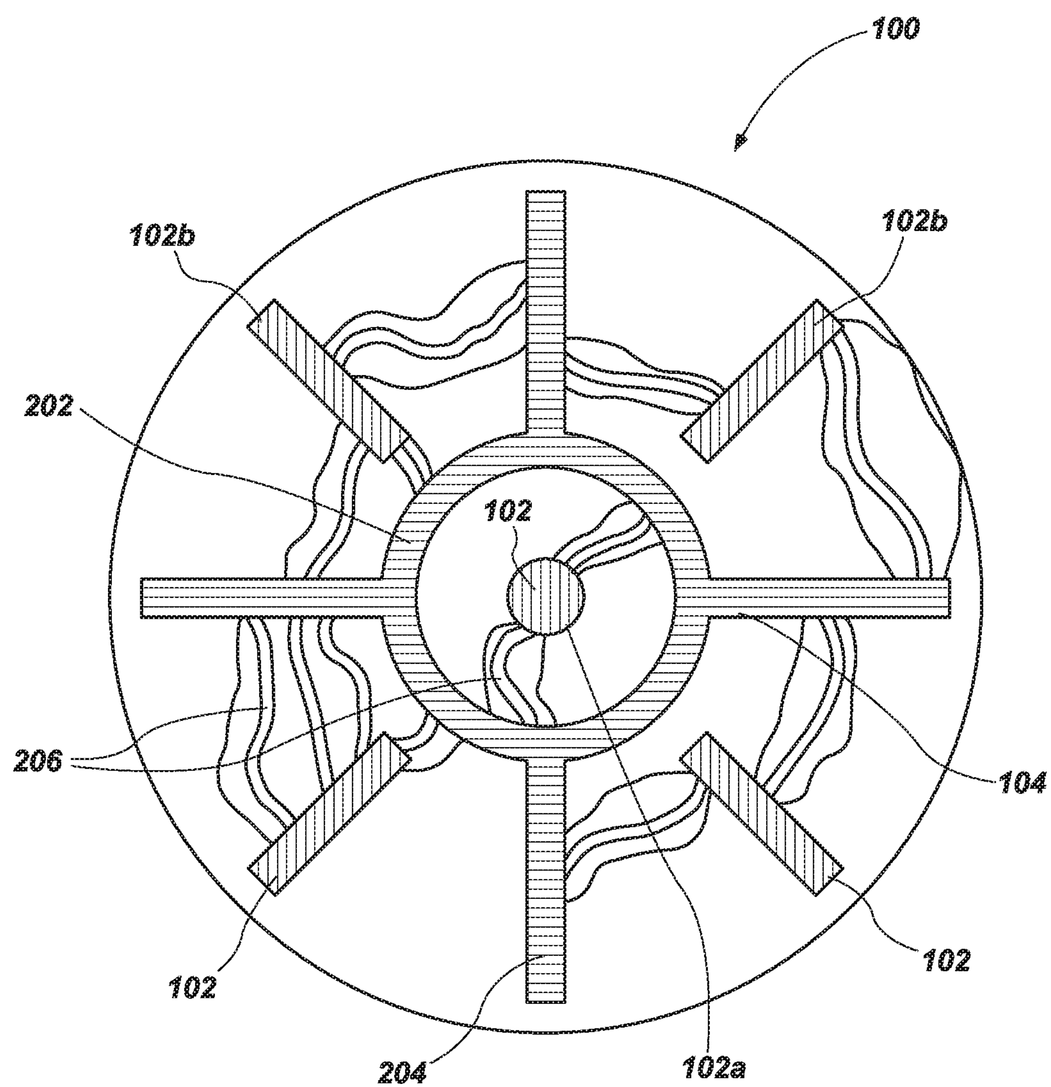
FIG. 2 illustrates a face view of an earth-boring tool according to an embodiment of the present disclosure.

FIG. 2 illustrates an embodiment of the earth-boring tool 100. The positive electrodes 102 may be arranged in a circular pattern. For example, the positive electrodes 102 may be arranged in a “star burst” pattern about a center electrode 102*a*. For example, the positive electrodes 102 may include a center electrode 102*a* and an array of radially extending positive electrodes 102*b* arranged in a circular pattern about the center electrode 102*a*. The radially extending positive electrodes 102*b* may be linear (e.g., straight lines). In some embodiments, the radially extending positive electrodes 102*b* may be non-linear. For example, the radially extending positive electrodes 102*b* may be curved (e.g., helical, sinusoidal, circular, etc.).

The negative electrodes 104 may be arranged between each of the positive electrodes 102. In some embodiments, the negative electrode 104 may be a single continuous contact. For example, the negative electrode 104 may be formed as a ring 202 surrounding the center electrode 102*a*. The negative electrode 104 may also include arms 204 extending radially outward from the ring 202. The arms 204 may be arranged between the radially extending positive electrodes 102*b*. In some embodiments, the negative electrodes 104 may be an array of negative electrodes 104 arranged in a similar manner to the positive electrodes 102.

When in operation, electrical pulses 206 may be provided through the positive electrodes 102. The electrical pulses 206 may travel from each respective positive electrode 102 to the nearest portion of the negative electrode 104. For example, the electrical pulse 206 from the center electrode 102*a* may travel to a point on the ring 202. The electrical pulse 206 from one of the radially extending positive electrodes 102*b* may travel to the nearest arm 204 of the negative electrode 104. In some embodiments, electrical pulses 206 may travel from multiple positive electrodes 102 to a common portion of the negative electrode 104. For example, electrical pulses 206 may travel from the center electrode 102*a* to the ring 202 and electrical pulses 206 may travel from one of the radially extending positive electrodes 102*b* to the ring 202. In another example, electrical pulses 206 may travel from at least two of the radially extending positive electrodes 102*b* to a common arm 204 of the negative electrode 104 located between the at least two radially extending positive electrodes 102*b*.

The electrical pulses 206 may be provided at intervals of less than about one pulse every 1 second, such as intervals of between about 1 pulse per second and about 1000 pulses per second, or between about 5 pulses per second and about 500 pulses per second or between about 10 pulses per second and about 100 pulses per second.

Figure 3:
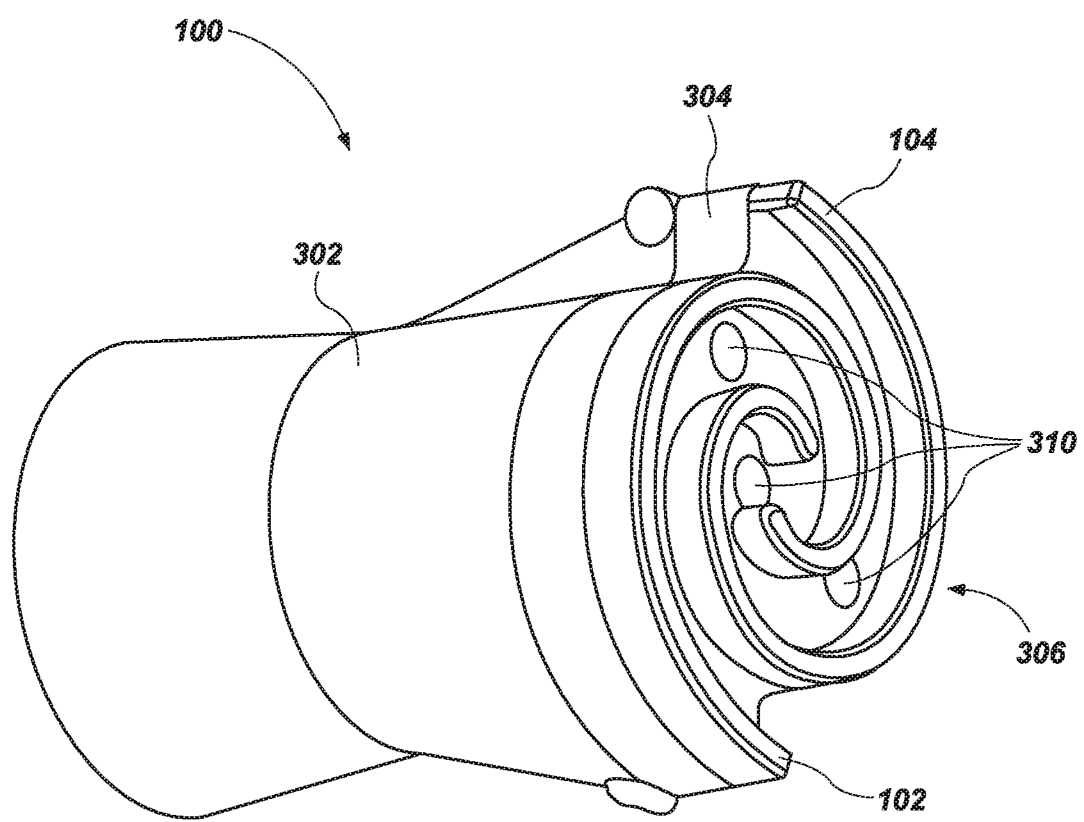
FIG. 3 illustrates an isometric view of an earth-boring tool according to an embodiment of the present disclosure.

FIG. 3 illustrates an embodiment of the earth-boring tool 100. The earth-boring tool 100 may include a bit body 302. The bit body 302 may be formed from any suitable drill bit material. In some embodiments, the bit body 302 may be formed of metal. The earth-boring tool 100 may include an insulating layer 304 that electrically separates the bit body 302 from the electrodes 102, 104. The insulating layer 304 may be formed of Ceramic (e.g., Zirconium-Oxide), Plastic Material (e.g., PEEK, PTFE), Elastomers (Silicon) or insulating composite fiber materials depending on and in alignment with the electrical strength of the formation and/or the drilling fluid, as well as the design of the electrodes 102, 104. The electrodes 102, 104 may be disposed on a face 306 of the earth-boring tool 100 that is intended to be the forward most point of a drill string while in operation. The face 306 may be defined by the insulating layer 304. In some embodiments, the electrodes 102, 104 may extend outwardly from the insulating layer 304. In some embodiments, the electrodes 102, 104 may be positioned on the surface of the insulating layer 304. In some embodiments, the electrodes 102, 104 may have portions that are embedded in the insulating layer 304. In some embodiments, the electrodes 102, 104 may have a protective coating disposed on them or may otherwise be protected from damage due to harsh drilling conditions.

Some embodiments may use contact configurations and geometry similar to those described in, for example, U.S. patent application Ser. No. 15/410,955, filed Jan. 20, 2017, and titled “ELECTRICAL PULSE DRILL BIT HAVING SPIRAL ELECTRODES” the disclosure of which is incorporated herein in its entirety by this reference.

The earth-boring tool 100 may include an internal passage that allows a drilling fluid to be pumped through it. That fluid may exit the face 306 via jets 310. Such fluid may be directed outwardly in a direction between the electrodes 102, 104. In some embodiments, the flow may help clear cuttings caused by discharges between electrodes 102, 104.

Figure 4:
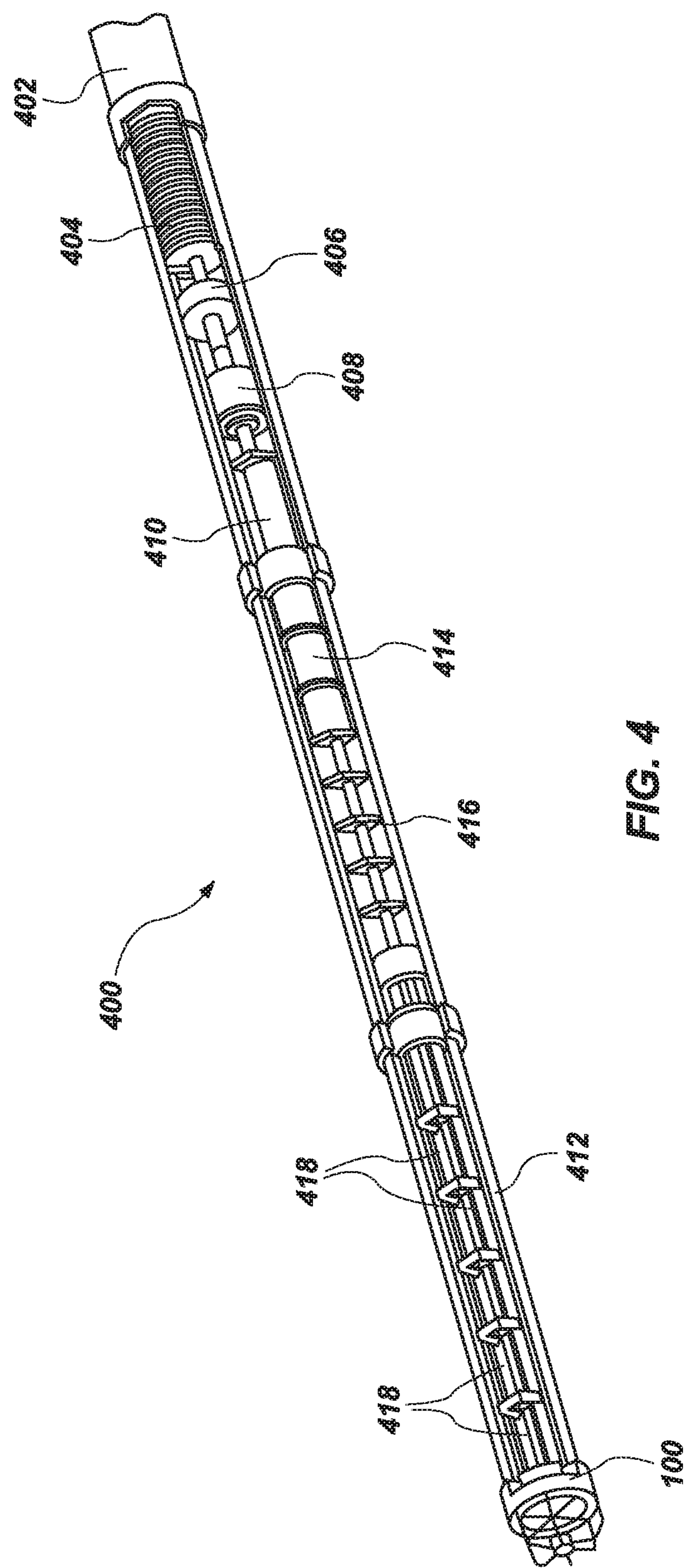
FIG. 4 illustrates an isometric view of a bottom hole assembly according to an embodiment of the present disclosure.

FIG. 4 illustrates an embodiment of a bottom hole assembly (BHA) 400. The BHA 400 may include an earth-boring tool 100 configured to contact and remove material from a downhole formation 114. A motor 402 (sometimes referred to as a “mud motor”) may be coupled to the BHA 400 at a first end of the BHA 400. The motor 402 may also couple the BHA to a drill string that may be fed in from a drilling station at the surface. The BHA 400 may include a power supply 404. In some embodiments, the power supply 404 may be part of the motor 402, such as a turbine, a capacitor, or a battery. In some embodiments the power supply 404 may be a battery that is charged by the motor 402. In some embodiments, the motor 402 may be configured to generate power through the power supply 404. For example, the power supply 404 may include a gearbox 406 and a generator 408. The motor 402 may input mechanical power into the gearbox 406. The generator 408 may then convert the mechanical power from the gearbox 406 into electrical energy. The electrical energy may be stored in a surge power source 410. The surge power source 410 may store the electrical energy until it is discharged through the earth-boring tool 100.

The surge power source 410 may supply the stored energy to a high voltage generator 412. In some embodiments, the stored energy may pass through a transformer 414 and/or a rectifier 416. The transformer 414 may provide an initial step up to a higher voltage. In some embodiments, the energy may be provided in alternating current from the generator 408. The rectifier 416 may convert the alternating current energy to direct current energy before passing the current to the high voltage generator 412.

The high voltage generator 412 may be a Marx generator or a Tesla generator similar to that described in, for example, U.S. patent application Ser. No. 15/410,955, filed Jan. 20, 2017, and titled “ELECTRICAL PULSE DRILL BIT HAVING SPIRAL ELECTRODES” the disclosure of which was previously incorporated herein in its entirety by reference. For example, the high voltage generator 412 may comprise a series of capacitors 418 configured to be charged in a first parallel orientation. A series of switches may then change the series of capacitors 418 to a second series orientation such that a voltage stored in each capacitor 418 is added to the voltages in the other capacitors 418 in the series connection generating a much higher voltage that may then be supplied to the positive and negative electrodes 102, 104 in the earth-boring tool.

In some embodiments, the motor 402 may also be configured to rotate at least a portion of the BHA 400. For example, the motor 402 may rotate the entire BHA 400. In another example, the motor 402 may rotate an outer shell of the BHA 400. The outer shell may cause the earth-boring tool 100 to rotate relative to other components of the BHA 400, such as the power supply 404 and the surge power source 410.

Figure 5A:
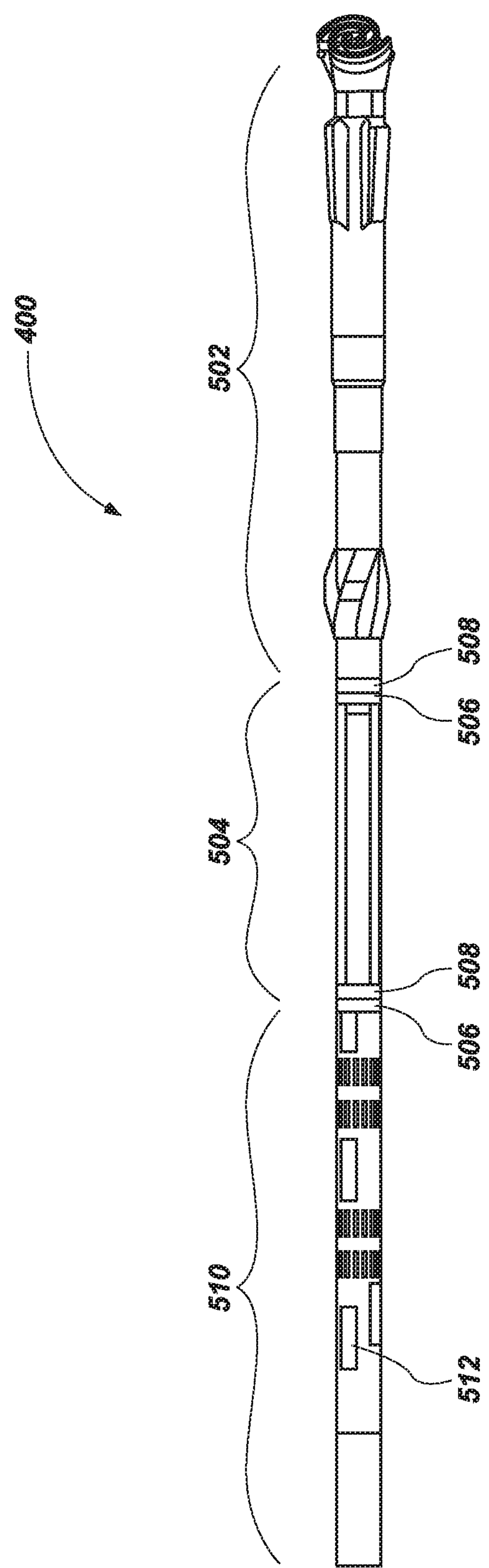
FIG. 5A illustrates an isometric view of the bottom hole assembly illustrated in FIG. 4 according to an embodiment of the present disclosure.

FIG. 5A illustrates an embodiment of the BHA 400 with an exemplary electronics layout. The BHA 400 may be separated into at least three different sections. The at least three sections may be defined by the type of communication used therein. For example, a high voltage region 502 may use a communication protocol capable of operating in high voltage environments (e.g., environments with large amounts of electrical noise and/or interference). For example, the high voltage region 502 may use protocols such as fiber optics CAN, wire CAN, RS-485, RS-232, or RS-422. Such protocols may be substantially immune to the electrical interference and/or noise present in high voltage environments.

A short hop region 504 may include moving BHA components such as the motor 402, the gearbox 406, and/or the generator 408 (FIG. 4). The short hop region 504 may use a wireless data transmission system to relay data to and/or from the high voltage region 502. For example, the short hop region 504 may use a wireless data communication system such as, electromagnetic telemetry (EM) or acoustic data transmission systems. Such communication systems may be used to transmit data across moving components where wired communication is not possible. The wireless communication system may have a relatively short range. The short hop region 504 may include at least one transmitter 506 and receiver 508 on each end of the short hop region 504. The transmitter 506 and receiver 508 may be configured to transmit data from the respective region and receive data transmitted from the opposing region.

A low voltage region 510 may use standard downhole communication protocols such as wired drill pipe, mud pulse telemetry, etc. The low voltage region 510 may be substantially free from internal and/or external electrical noise and/or interference. For example, the low voltage region 510 may be a distance from the high voltage region 502 such that the large electrical fields associated with the high voltage region substantially dissipate, for example, into the formation. The low voltage region 510 may include low voltage components that generate minimal electrical noise and/or interference with respect to the noise and interference present in the high voltage region 502. In some embodiments, electronic modules 512 such as logging while drilling (LWD) modules, measuring while drilling (MWD) modules, control modules, steering modules, etc. may be positioned within the low voltage region 510. In some embodiments, the electronic modules 512 may communicate with components such as steering components, speed control components, etc. that may be positioned in the high voltage region 502. In some embodiments, the electronic modules 512 may collect data from sensors that may be positioned within the high voltage region 502. For example, the electronic modules 512 may collect data related to the downhole conditions such as, vibration at the earth-boring tool 100, downhole temperatures, downhole pressures, weight on bit, fluid flow, etc. In another example, the electronic modules 512 may collect data related to properties of the formation 114 (FIG. 1) such as, density, porosity, resistivity, magnetic resonance, formation pressure, composition of the formation, etc., responsive to waves (e.g., ultrasonic waves, magnetic waves, microwaves, etc.) and/or particles (e.g., quantum particles, quarks, electrons, positrons, baryons, photons, gravitons, etc.) traveling through the formation. The electronic modules 512 may be configured to receive data and/or instructions from the surface and/or to transmit data to the surface.

Figure 5B:
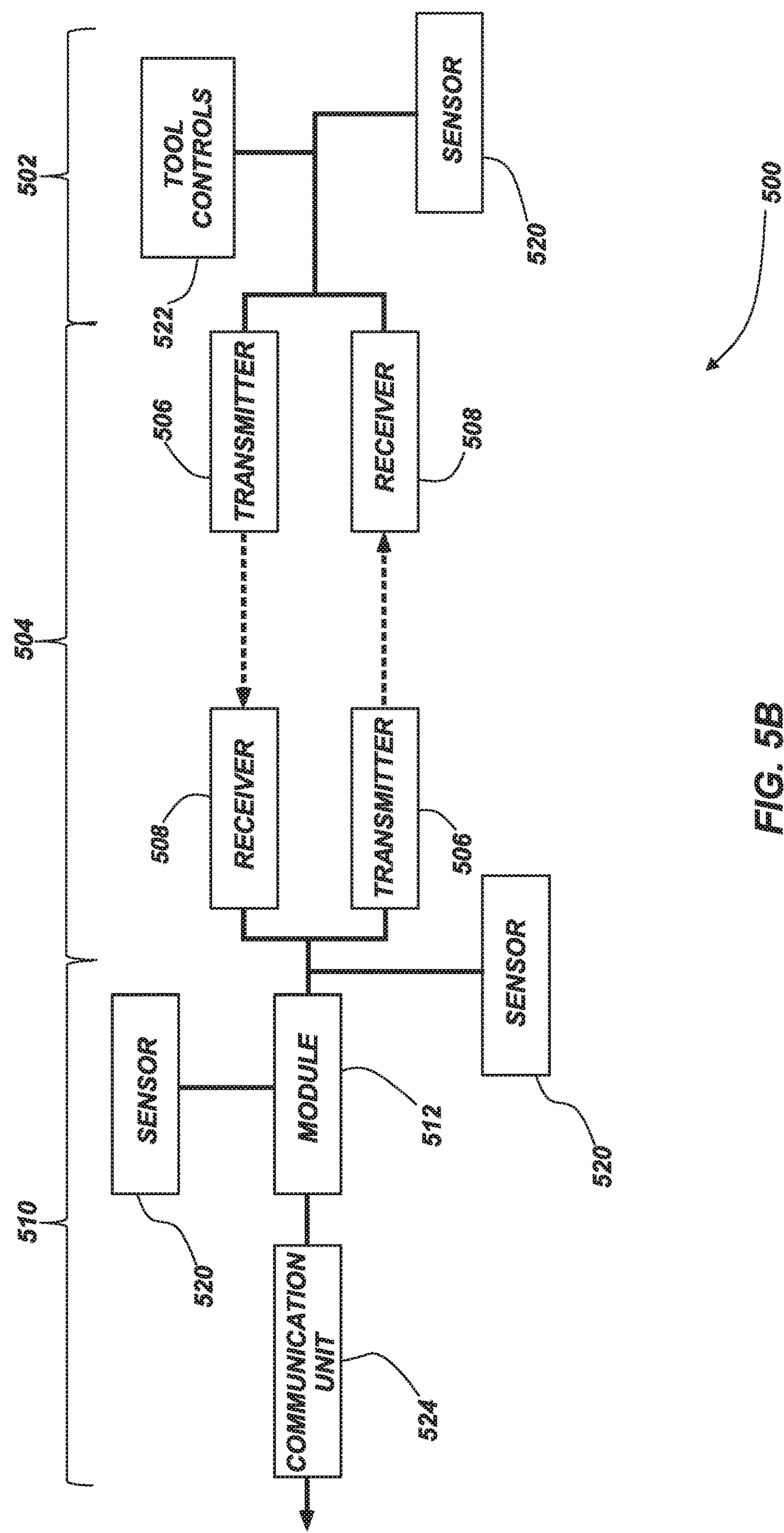
FIG. 5B illustrates a simplified control wiring schematic of the bottom hole assembly illustrated in FIG. 5A according to an embodiment of the present disclosure.

FIG. 5B illustrates a simplified wiring schematic of the control wiring 500 in the BHA 400. The control wiring 500 may include sensors 520, electronic modules 512, tool controls 522, and communication units 524 among other things. The high voltage region 502 may include sensors 520 such as, vibration sensors, temperature sensors, pressure sensors, quantum particle detectors, etc. The sensors 520 may communicate sensor readings to the electronic modules 512. In some embodiments, the sensors 520 may provide raw signal data such as a representative voltage (e.g., 0-10 VDC, 0-5 VDC, etc.), amperage (e.g., 4-20 mA, etc.), a resistance (e.g., thermistor, resistance temperature detector (RTD), a frequency, etc.) to a conversion module configured to translate the raw signal to a format that may be transmitted over the substantially noise immune communication protocol in the high voltage region 502. In some embodiments, the sensors 520 may be configured to internally convert the raw sensor data to the substantially noise immune communication protocol and transmit the data on the network in the high voltage region 502.

The sensor readings may be transmitted from a transmitter 506 positioned near the high voltage region 502. For example, the transmitter may be located in the short hop region 504 just outside the high voltage region. In some embodiments, the short hop region 504 may begin a sufficient distance behind the high voltage components (e.g., high voltage generator 412, transformer 414, and earth-boring tool 100) that the electrical fields of the high voltage components are sufficiently dissipated to not significantly interfere with the wireless signals between the respective transmitters 506 and receivers 508. In some embodiments, the electronic modules 512 may store the readings from the sensors 520 for evaluation after the BHA 400 is removed from the wellbore. For example, the electronic modules 512 may include a memory device, such as a removable memory device or an internal memory device configured to transmit data through an external connector. In some embodiments, the electronic modules 512 may relay the readings from the sensors 520 to the surface through a communication unit 524. The communication unit 524 may be located in the low voltage region 510 along with the electronic modules 512. In some embodiments, the communication unit 524 may control network traffic in the low voltage region 510. In some embodiments, the communication unit 524 may be connected to the surface, for example, through communication wires in the drill string. In some embodiments, the communication unit 524 may communicate to the surface through a wireless communication system, such as mud pulse telemetry.

The high voltage region 502 may also include tool controls 522 such as, steering components configured to change a drilling angle of the earth-boring tool 100. An operator at the surface may communicate commands to the tool controls 522 through the communication unit 524. For example, the communication unit 524 may receive commands from the surface. The communication unit 524 may transmit the commands through the respective transmitter 506 in the short hop region 504 to the respective receiver 508 on an opposite end of the short hop region 504 near the high voltage region 502. The receiver 508 may then transmit the command to the tool controls 522 through the noise immune communication in the high voltage region.

In some embodiments, the low voltage region 510 may include sensors 520. In some embodiments, the sensors 520 may be connected to the electronic modules 512 directly. For example, the sensors 520 may provide a readings to the modules as raw sensor data, such as a representative voltage (e.g., 0-10 VDC, 0-5 VDC, etc.), amperage (e.g., 4-20 mA, etc.), or a resistance (e.g., thermistor, resistance temperature detector (RTD), etc.). In some embodiments, the sensors 520 may transmit the sensor data through a communication protocol present in the low voltage region 510. For example, the sensors 520 may communicate sensor data to the electronic modules 512 through the communication unit 524 or on a sub-network separated from the communication unit 524 by the electronic module 512.

Figure 6:
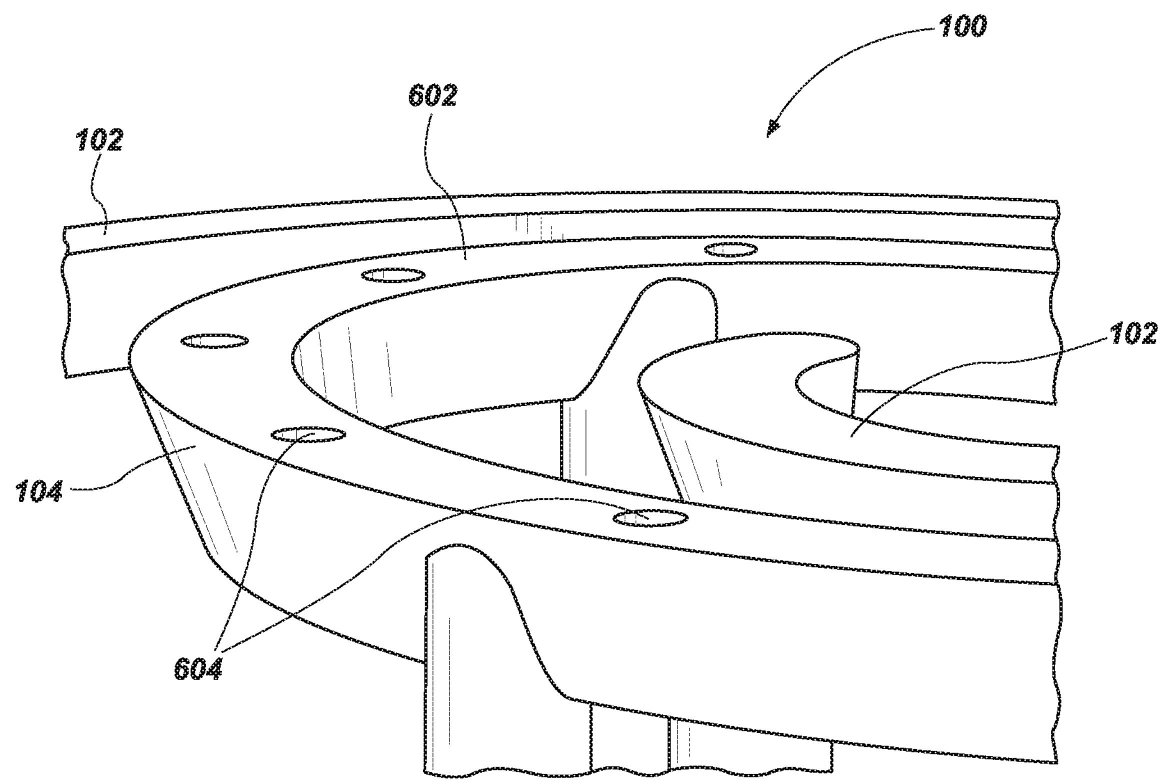
FIG. 6 illustrates an expanded view of the electrodes associated with the earth-boring tool illustrated in FIG. 3 according to an embodiment of the present disclosure.

FIG. 6 illustrates an expanded view of the electrodes 102, 104 associated with an embodiment of the earth-boring tool 100 (FIG. 1). The two electrodes 102 and 104 may be assembled in a spiral arrangement. A front face 602 of at least one of the two electrodes 102, 104 may include at least one port 604. The ports 604 may be a hole or recess extending into the interior of the electrode from an exposed outer surface thereof. The ports 604 may be configured to house sensors configured to monitor properties of the formation 114 (FIG. 1).

The fast rising electric field 115 (FIG. 1) that may be generated in the formation 114 (FIG. 1) from the high voltage rise between the positive electrode 102 and the negative electrode 104 may cause the release of electrons, positrons, neutrons and/or ions from the materials in the formation. The release of electrons, positrons, neutrons, and/or ions may be related to temporary movement (e.g., linear displacement, oscillation, turning, etc.) around the original centers of gravity of the atoms in the material because of the fast rising electric field 115. For example, the fast rising electric field 115 may cause the core (e.g., nucleus) of the atoms to displace to an offset position within the atom. The displacement of the core may result in a "white hole" at the original position of the core (e.g., the original center of gravity of the atom). The white hole may be positively or negatively charged. The charge of the white hole may be detectable as the emission of a positron and/or electron from the atom, or the absorption of a positron and/or electron by the atom. One or more positrons and/or electrons may be released from each atom depending on the strength and speed of the electric field 115 (FIG. 1). The released positrons and/or electrons may result in quantum particles including quarks, electrons, positrons, baryons, photons, and gravitons traveling through the formation 114. The released quantum particles in and out of "white hole" may be related to energy equilibrium since singularity. Singularity may be hypothetically defined as point of time with a frozen exchange of information without energy (I/E=0) but a possible predefined structure of an information/energy composition according to formula:

$$I/E=1/f(gxy)*I/m_{xy}*c^2+1/f(axy)*I/m_{xy}*c^2+1/f(gz)*I/m_z*c^n$$

Where I=Information about any structure, E=Energy, m=Mass, f(g,a)=gravity and acceleration functions, c=Speed of light constant, n=Speed of light exponent in transition zone, f(gxy)=function of gravity on a plane defined by x and y, f(axy)=function of acceleration on the plane defined by x and y, f(gz)=function of gravity perpendicular to the plane defined by x and y (e.g., nonotron condition related entry/exit of quantum on plane), $m_{xy}$, mass on the plane defined by x and y, $m_z$ mass perpendicular to plane defined by x and y.

An artificial quantum physics transfer tunnel represents information and/or mass, such as quantum particle structure information and/or quantum particles with mass, in transition to parallel remote planes through a channel opened by extremely high energy associated with a high gravity field strength induced by electric fields and/or electromagnetic fields. For example an electric field having a strength greater than about 1,000,000 V/m, such as an electric field having a strength between about 1,000,000 V/m and about 100,000,000 V/m, between about 5,000,000 V/m and about 20,000,000 V/m, or about 30,000,000 V/m, may generate an extreme high gravity field sufficient to open a channel. The electromagnetic field may have a local flux density greater than about 1,000 Tesla, such as a flux density between about 1,000 Tesla and about 2,000,000 Tesla, between about 100,000 Tesla and about 1,000,000 Tesla, or about 1,000,000 Tesla. Flux densities greater than about 1,000 Tesla may be sufficient to maintain nonotron conditions at plasma or at transition zone from a plasma channel to plasma surrounding material. A magnet with a weight of 0.002 kg formed by current draw of 7,000 Ampere through the plasma, induced by a 30,000,000 V/m electric field, over 50 nanoseconds could achieve a local magnetic field strength of for example 1.143E6 Tesla. This local magnetic field strength may be comparable to the magnetic field strength on the surface of a neutron star where magnetic field strengths range from 104 to 1011 Tesla. The Electric Impulse Technology (EIT) plasma channel and affected area of high magnetic field strength may have a major dimension (e.g., radius, diameter, apothem, etc.) between about 1 nanometer (nm) and about 1 millimeter (mm), such as between about 10 nm and about 100 micrometers (μm). Whereas a neutron star beam or channel radii with high magnetic field strength zones may be between about 100 meters and about 1 kilometer m due to a much higher energy content.

The sum of distributed information/energy at singularity may be assumed to be zero before the generation of quantum particles. All mass except smallest possible quantum granulate may be assumed to be close to zero. Gravity and acceleration functions f(g,a) may also be assumed to be close to zero due to missing start displacements. The information/mass $I/m_z$ may become a value incidentally while exponent n may have an endless value. The function f(gz) may become a value due to $I/m_z$ becoming an information and/or mass. Information/Energy I/E may become a maximum value to split the information/mass $I/m_z$. The information/mass $I/mx_y$ may be born to start development/movement/expansion with a speed fc (e.g., BUZZ, Build Up Z-Z), the information, gravity and acceleration functions may be in balance on build gravity planes. The gravity planes may be a surface of space of a "standard physics" build. Imperfections or dents on surface at high gravity concentrations may enable communication between planes. The sum of enabled information content/energy may remain constant but distributed on different gravity planes due to the singularity. The exchange of information and/or quantum particles between planes (e.g., micro planes and macro planes) may be possible by stretching the plane surface through the induced extreme high local field strength or through existing remaining channels of space expansion. For example, quantum particles may exchange through the stretching of a Deuterium atomic core. Exchange of particles information can occur with speed $c^n$, where n may be in a range of about 0 to 11 with regard to maximum number of expected degrees of freedom in existing space. Quantums like gravitons may exchange between gravity planes faster than the speed of light (e.g., $c^9$) and therefore not be detectable with standard model based technology.

The proven existence of quantum entanglement is supported by the above hypothesis. Without development or expansion, information can be lost, deluded or hidden rapidly by division according to the above formula. Space may need to expand as well for self-protection. Counters and denominators of the above formula may be exchangeable when the system is operating near stable conditions. Three-dimensional expansion of information may be followed by transition into two dimensions (Plane) expansion of information flowed by one-dimensional expansion of information (Line) finalized by shrinkage to one point of information while transforming mass and energy into information about quantum particles. For example, three-dimensional to two-dimensions or two-dimensional to three-dimensional transformations may leave information about the transformation of quantum particles in the space and the information may be detectable by sensors. The probability of detections of information about quantum particles may be calculated by Fermi-Dirac Statistics.

Sensors capable of detecting the quantum particles or information about quantum particles may be placed in the ports 604. For example, sensors such as gas-detectors (e.g., gaseous ionization detectors, ionization chamber, proportional counter, Geiger-Müller tube, spark chamber, etc.), solid-state-detectors (e.g., charge-coupled devices (CCD), semiconductor detectors, nuclear track detectors, Cherenkov detectors, scintillation counters, photomultipliers, photodiodes, avalanche photodiodes, transition radiation detectors), oxygenated silicon, PIN diodes (e.g., Si PIN diodes, InGaAs PIN diodes, Ga PIN diodes, etc.); CVD-diamond detectors, and/or superconducting quantum interference devices (SQUIDs) (e.g., DC SQUID, RF SQUID, etc.) may be positioned in the ports 604.

Properties of the quantum particles may be interpreted to discover information about the formation 114 adjacent to the electric field 115 that created the quantum particles. For example, a travel time of the quantum particles may be interpreted to characterize a density, porosity, and/or resistivity of the formation 114. In another example, the makeup of the quantum particles may be interpreted to characterize a composition, or magnetic resonance of the formation. In yet another example, the number of each type of quantum particle (e.g., quarks, electrons, positrons, baryons, photons, and gravitons) may reveal additional information about the formation such as chemical composition, physical composition and 3-D geometry of selected regions, 3-D geometry in general, localized specific density, pore composition and pressure, porosity, fluid conductivity (e.g., open pores vs. close pores), dip, stress, stress state, and electrical resistivity as well as other parameters for measuring while drilling (MWD) or logging while drilling (LWD) tasks.

In some embodiments, multiple sensors may be positioned in multiple ports 604 in the front face 602 of the earth-boring tool 100. In some embodiments, one or more of the multiple sensors may be redundant (e.g., configured to detect the same properties of the same types of quantum particles). In some embodiments, one or more of the multiple sensors may be configured to detect different properties of the quantum particles. For example, one or more of the sensors may be configured to detect a charge of the quantum particles and other sensors may be configured to detect a travel time of the quantum particles. In some embodiments, one or more of the sensors may have a higher sensitivity than other sensors such that quantum particles having less energy that may not be detected by the other sensors may be detected by the one or more sensors with higher sensitivity.

Figure 7:
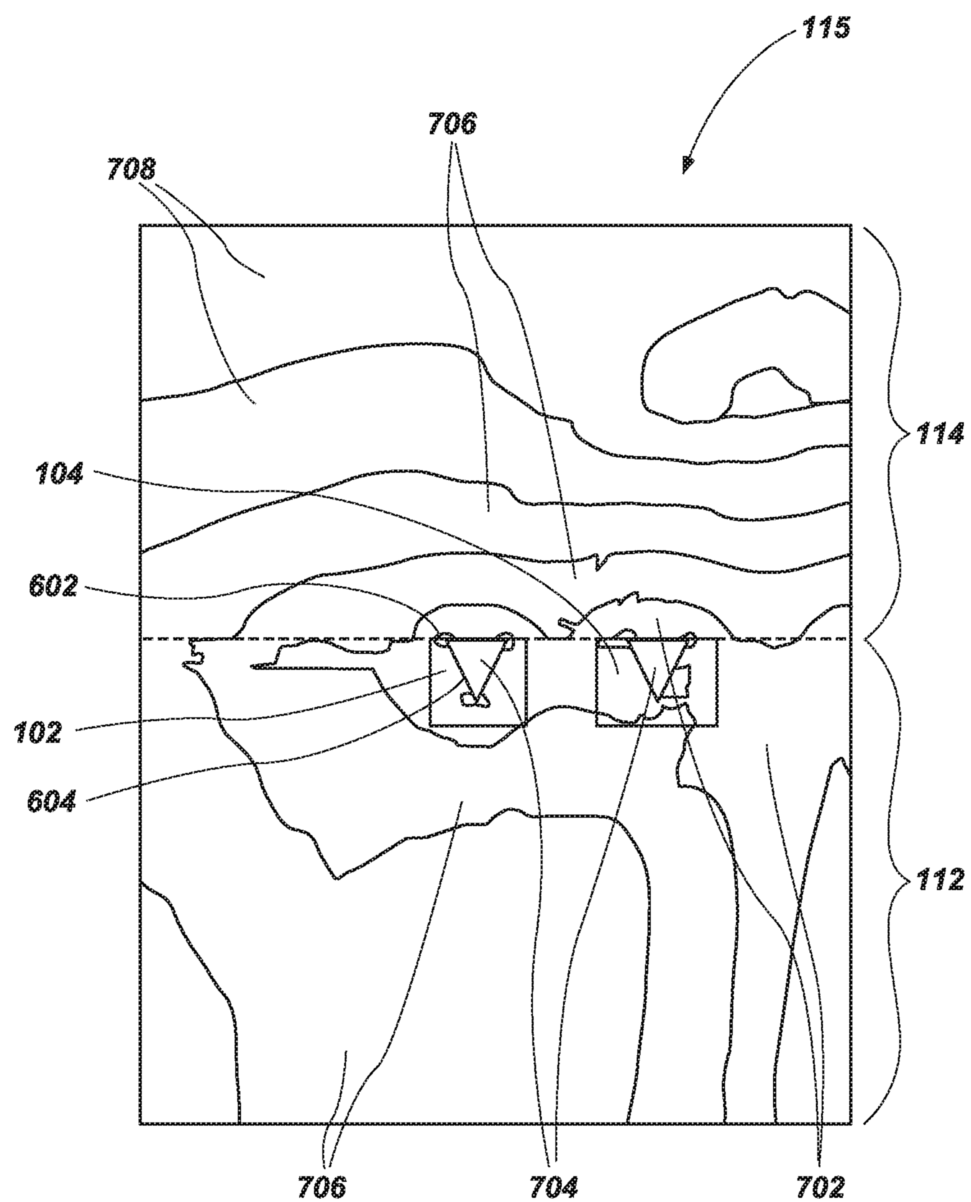
FIG. 7 illustrates a charge strength model of a portion of the earth-boring tool illustrated in FIG. 6 according to an embodiment of the present disclosure.

FIG. 7 illustrates a model of the electric field 115 around the earth-boring tool 100. The electric field 115 may define different zones around the earth-boring tool 100 depending on the strength of the electric field 115 in each zone. In each zone the quantum particles generated may have different properties. In the area immediately surrounding the earth-boring tool 100 a plasma zone 702 may be defined where the electric field 115 is strongest. The plasma zone 702 may have the greatest number of dislocated quantum particles. The dislocated quantum particles in the plasma zone 702 may also have the highest energy. The earth-boring tool 100 may include sensors 704 in the ports 604 in the front face 602 of the earth-boring tool 100. One or more of the sensors 704 may be configured to detect and/or measure properties of the quantum particles in the plasma zone 702. The plasma zone 702 may reveal information regarding the formation in an area immediately adjacent to the earth-boring tool 100. For example, information regarding the fractured portions 118 (FIG. 1) of the formation 114 and the portions of the formation exposed by the fractured portions 118 or surfaces of the formation 114 immediately surrounding the earth-boring tool 100.

The next zone in the electric field 115 may be a high energy zone 706. The high energy region may still have sufficient strength in the electric field 115 to generate a large number of dislocated quantum particles with relatively high energy. The dislocated quantum particles in high energy zone 706 may have energy levels that are lower than the energy levels of the dislocated particles in the plasma zone 702. One or more of the sensors 704 on the earth-boring tool 100 may be configured to detect properties of the quantum particles in the high energy zone 706. For example, one or more of the sensors 704 on the earth-boring tool 100 may have a higher sensitivity than other sensors 704 such that the lower energy quantum particles in the high energy zone 706 may be detected by the one or more sensors 704 when the energy of the quantum particles may not be sufficient for detection by sensors 704 configured to detect dislocated particles from the plasma zone 702.

A third zone in the electric field 115 may be the low energy zone 708. The electric field 115 in the low energy zone 708 may still have sufficient strength to generate some dislocated quantum particles. However, there may be fewer dislocated quantum particles than the plasma zone 702 or high energy zone 706 and the dislocated quantum particles in the low energy zone 708 may have lower energy levels than the dislocated quantum particles of the high energy zone 706 or the plasma zone 702. Detecting the quantum particles or properties of the quantum particles from the low energy zone 708 may require sensors 704 with higher sensitivity than the sensors 704 that are configured to detect quantum particles in the plasma zone 702 or the high energy zone 706.

In some embodiments, additional sensors 704 may be included in other regions of the drill string. The additional sensors 704 may detect quantum particles dislocated in the different zones 702, 706, or 708 of the electric field 115 that travel through the formation 114 or in the fluid 112 a distance outside of the zones 702, 706, and 708 where the quantum particles were dislocated. Properties of the quantum particles such as travel time, number of particles, types of particles, etc. may be interpreted to determine features of the formation between the front face 602 of the earth-boring tool 100 and the additional sensors 704. For example, additional sensors 704 may be located on other regions of the earth-boring tool 100 away from the front face 602. The properties of the quantum particles that reach the sensors 704 on the other regions of the earth-boring tool may provide information about the formation 114 on the sides of the earth-boring tool 100. In some embodiments, additional sensors 704 may be located on other portions of the BHA 400 such as the high voltage region 502 or the low voltage region 510. In some embodiments, additional sensors 704 may be located on the drill string between the BHA 400 and the surface.

In some embodiments, additional sensors 704 may be located in the formation 114. For example, sensors 704 may be located in the formation 114 near the surface or near the shore in off-shore drilling operations. Quantum particles that travel from the zones 702, 706, and 708 of the electric field 115 may provide information regarding characteristics of the portion of the formation 114 through which the particles travel to reach the additional sensors 704 in the formation 114.

Figure 8:
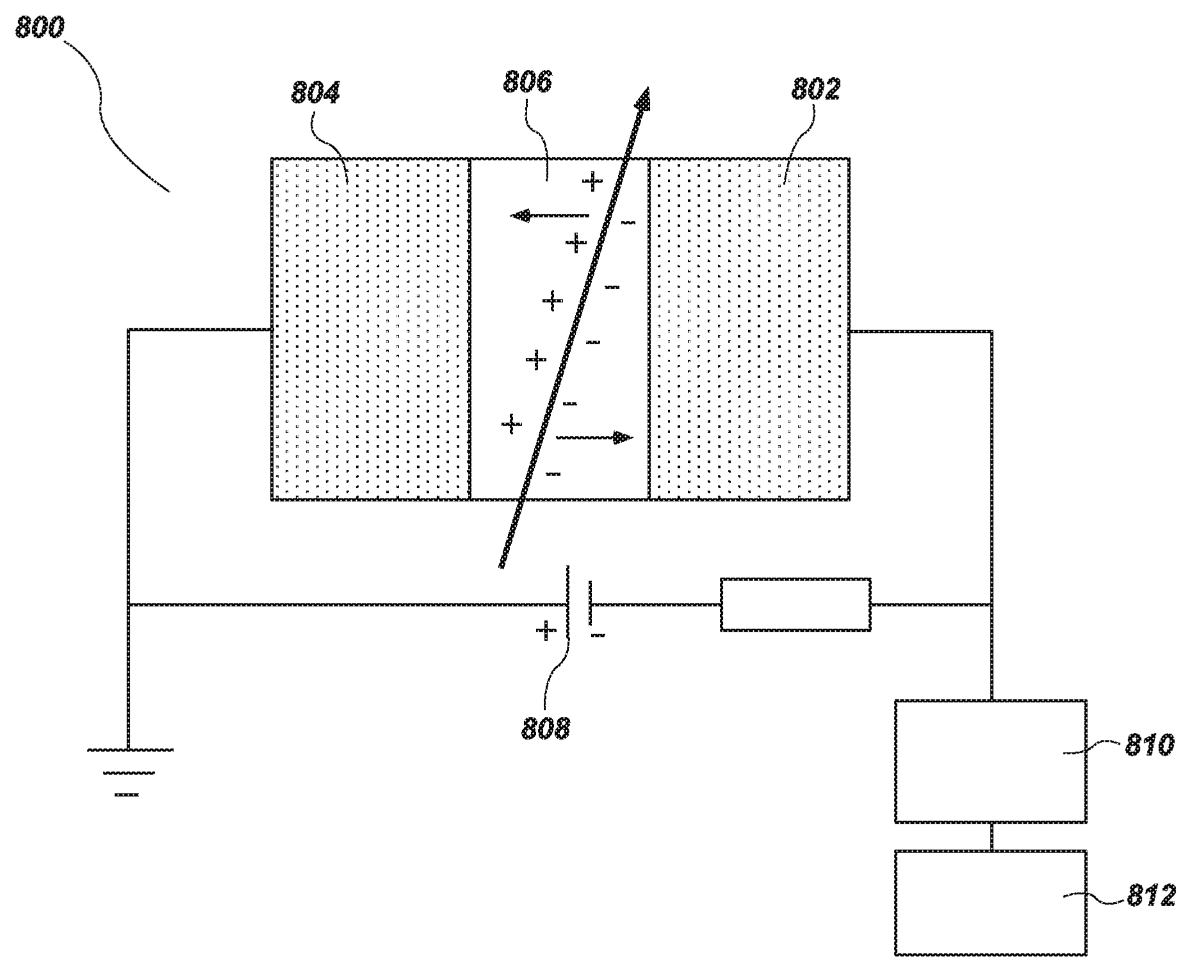
FIG. 8 illustrates a diagrammatic view of a sensor according to an embodiment of the present disclosure.
Figure 9:
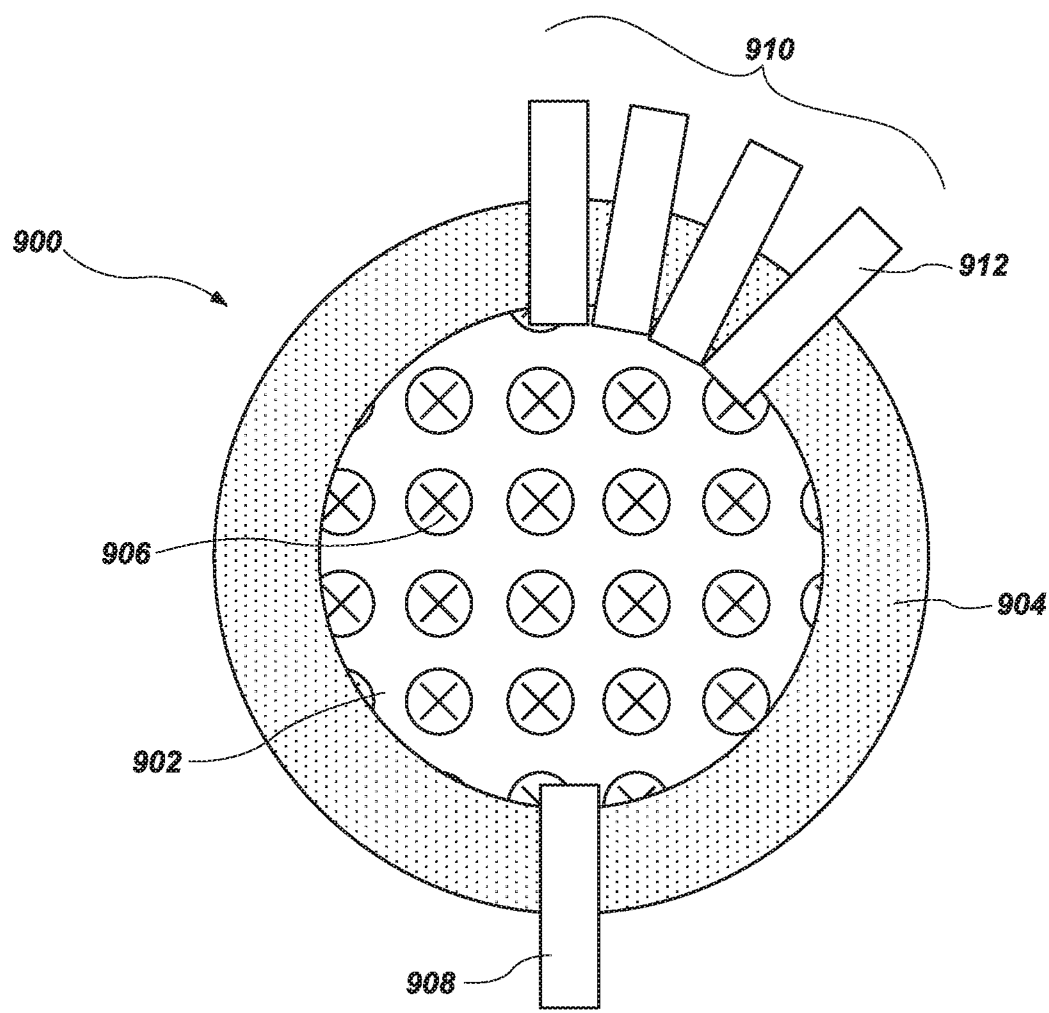
FIG. 9 illustrates a diagrammatic view of a sensor according to an embodiment of the present disclosure.

The sensors 704 may measure multiple different types of quantum particles and/or radiation produced by the quantum particles to capture different information about the formation. For example, sensors 704 configured to capture photons released by X-rays traveling through the formation may provide information regarding formation shape, geometry, density, composition, etc. of the formation, while sensors 704 configured to captured alpha particles, beta particles, and/or gamma particles may provide information regarding the chemical makeup, elemental composition, etc. of the formation. In some embodiments, the sensors 704 may detect at least three different types of quantum particles to capture a full picture and granularity of the formation. The three types of quantum particles may be chosen from photons, alpha particles, beta particles, and gamma particles. In some embodiments, one sensor 704 may be configured to measure more than one type of quantum particle. In some embodiments, each sensor 704 may be specifically designed to measure only one type of quantum particle. FIGS. 8 and 9 illustrate exemplary embodiments of sensors 704 that may be used to measure quantum particles.

FIG. 8 illustrates a schematic view of a sensor 800 configured to measure alpha particles. Alpha particles may exhibit a wave characteristic. Some elements are known to emit alpha particles. For example, Thorium-227 and Americum-241 are elements that are known to emit alpha particles. Alpha particles may also be emitted through an induced nonotron condition. For example, as described above, a rapid rise of an electric field may cause a core displacement in the atoms around the electric field. The core displacement may induce alpha particles.

The sensor 800 may include a p-doped layer 802 and an n-doped layer 804. The p-doped layer 802 may have a positive charge and the n-doped layer 804 may have a negative charge. Bringing the p-doped layer 802 and the n-doped layer 804 together may cause diffusion of the electrons in the p-doped layer 802. The p-doped layer 802 and the n-doped layer 804 may be separated by a depletion region 806. Electron pairs may be created in the depletion region 806. A voltage 808 may be applied across the p-doped layer 802 and n-doped layer 804. The voltage may increase the number of electron pairs created in the depletion region 806.

When alpha particles are received in the depletion region 806 the alpha particles may cause the electron pairs in the depletion region 806 to accelerate. The acceleration of the electron pairs may generate a measureable current pulse. The energy of the particle may correlate to the size of the pulse. For example, a particle having high energy may penetrate deep into the depletion region 806 dislocating several electron pairs. The several dislocated electron pairs may generate a large current pulse. Another particle having low energy may be absorbed quickly and only dislocate a small number of electron pairs. The small number of dislocated electron pairs may generate a small current pulse. Accordingly, the size of the pulse generated may reveal information about an energy of the particle.

The sensor 800 may include a pulse rectifier 810 configured to prepare the current pulse to be measured. For example, the pulse rectifier 810 may filter noise out of the pulse. In some embodiments, the pulse rectifier 810 may amplify the pulse. The sensor 800 may also include a pulse height analyzer 812. The pulse height analyzer 812 may measure a size (e.g., height, strength, etc.) of the pulse. In some embodiments, the pulse height analyzer 812 may be configured to convert the size of the pulse to a signal readable by an associated transmitter 506, electronic module 512, controller, etc.

The sizes, frequencies, etc. of the pulses may be interpreted to reveal information about the formation. For example, Alpha particles captured by the sensor 800 may provide information regarding a chemical composition of the formation. The pulses may also provide information regarding the location of the source of the alpha particles.

FIG. 9 illustrates a sensor 900. Beta radiation may be measured by measuring a difference between beta-plus decay and beta-minus decay. Beta-plus radiation may result from the transformation of a proton into a neutron. Beta-minus radiation may result from the transformation of a neutron into a proton. The transformation of protons and neutrons may result from the fast rising electric field described above. Beta quantum particles are capable of traveling up to about 50 mm through a solid material, such as between about 5 mm and about 50 mm.

The sensor 900 may include a chamber 902. The chamber 902 may be defined within a wall 904. The wall 904 may be formed from a non-magnetic material (e.g., non-ferrous material, non-ferromagnetic material, etc.). In some embodiments, the chamber 902 may be a circular (e.g., annular, round, etc.) chamber 902. In some embodiments, the chamber 902 may be a spiral (e.g., helical, etc.) chamber 902. The chamber 902 may include at least one magnet 906. The at least one magnet 906 may be configured to generate a substantially homogeneous (e.g., uniform) magnetic field. For example, the at least one magnet 906 may be an array of permanent magnets. In some embodiments, the at least one magnet 906, may be a single permanent magnet. In some embodiments, the at least one magnet 906 may be an electromagnet. In some embodiments, the at least one magnet 906 may be an array of electromagnets.

The sensor 900 may include at least one entry 908. The at least one entry 908 may define a passageway through the wall 904. The entry 908 may be formed from a non-ferrous metal such as, aluminum, copper, lead, nickel, tin, titanium or zinc. The at least one entry 908 may be configured to allow quantum particles to enter the chamber 902 through the wall 904. The sensor 900 may also include a receiver array 910 configured to capture the quantum particles after the quantum particles pass through the chamber. The receiver array 910 may include a plurality of receivers 912 arranged in different radial positions.

A path of the quantum particles passing through the chamber 902 may be affected by the homogeneous magnetic field in the chamber. For example, a charge of the quantum particle may change an amount of deflection of the path of the quantum particle as it passes through the magnetic field. In some embodiments, an amount of energy of the quantum particle may affect the amount of deflection of the path of the quantum particle. In some embodiments, the type of quantum particle may affect the amount of deflection. For example, gamma quantum particles are not charged particles. Therefore, the path of gamma quantum particles may be unaffected by the magnetic field.

The sensor 900 may provide information regarding the energy of quantum particles over a distance (e.g., the distance traveled through the chamber 902). For example, a high energy quantum particle traveling at a high rate of speed may be deflected a smaller distance by the homogeneous magnetic field than a lower energy quantum particle traveling at a lower rate of speed. An energy level measured over a distance, and/or correlated half-life of isotopes over time, may provide information regarding chemical make-up of the source of the quantum particles. In some embodiments, a charge of the quantum particle (e.g., the type of quantum particle) may affect the amount or direction of deflection. The sensor may also provide information regarding the types and quantities of quantum particles measured, such as the number of electrons, alfa particles, beta particles and gamma particles which may provide additional information about the formation.

FIG. 10 illustrates a table 1000. The table 1000 represents exemplary elements 1002 that may be present downhole. Table 1000 also represents the types of quantum particles 1004 (e.g., alpha, beta, or gamma) associated with each exemplary element 1002. The table 1000 represents the different quantum energies 1006 that correlate with each exemplary element 1002. The quantum energies 1006 may be at least one feature of the exemplary elements 1002 that may be measured by the sensors 704 (FIG. 7). The table 1000 also represents the gamma energy 1008 associated with the respective exemplary elements 1002. In some embodiments, the sensors 704 (FIG. 7) may measure the gamma energy of the quantum particles. The table 1000 further illustrates the isotope radiation half-life 1010 for the exemplary elements 1002. As described above, the isotope radiation half-life 1010 may be correlated to the loss of energy over a distance of the associated quantum particle. In some embodiments, the loss of energy over a distance, as measured by a sensor 704 (FIG. 7), may be utilized to determine the isotope radiation half-life of the quantum particle. Accordingly, the elemental make-up of a formation may be determined from sensor measurements of quantum particles and evaluation of quantum energies, gamma energy, and/or isotope radiation half-life of the respective particles.

Two or more sensor arrays of the same and/or different types of sensors 704 may be positioned within a defined distance in a direction along an expected particle path to derive quantum particle speed and/or position of quantum particle source through algorithms such as triangulation and reverse particle path calculation. Source positioning in combination with quantum particle type detection may enable 3-D imaging of excavated or non-excavated formation structures. The combination of EIT process parameter and 3D Imagining may enable a calculation of stress state, porosity, conductivity and/or shape of the formation before and/or after rock excavation. Sufficient sensors at a forward sensor array and a back sensor arrays may enable spectrographic analytics through a process such as interference, diffraction, and refraction image analysis.

Downhole measurement systems may allow an operator to guide the drill string toward more desirable portions of the formation. For example, parts of a formation that are more stable may be a more desirable region through which to pass the earth-boring tool. In some embodiments, accurate information about the downhole environment may allow the user to make decisions on path, speed, weight on bit, rate of penetration, voltage, pulse frequency, etc. to more efficiently advance the earth-boring tool and associated drill string. A drilling operation can be time consuming generally advancing between one and two meters an hour. Accurate determinations of the downhole environment and information about the formation may result in advancing the earth-boring tool at a faster rate by selecting a path that is more desirable. Monitoring the formation may also enable an operator to more accurately predict a position of the BHA within the formation. For example, often a composition of the formation is known as such when the sensors detect a change in characteristics in the formation that may inform the operator what portion of the formation the BHA is entering enabling the operator to position the BHA in the most desirable area and/or stop the drilling operation when a desired location has been reached.

The embodiments of the disclosure described above and illustrated in the accompanying drawing figures do not limit the scope of the invention, since these embodiments are merely examples of embodiments of the invention, which is defined by the appended claims and their legal equivalents. Any equivalent embodiments are intended to be within the scope of this disclosure. Indeed, various modifications of the present disclosure, in addition to those shown and described herein, such as alternative useful combinations of the elements described, may become apparent to those skilled in the art from the description. Such modifications and embodiments are also intended to fall within the scope of the appended claims and their legal equivalents.

What is claimed is:

1. A downhole tool comprising:

an electrical power source;

a positive electrode and a negative electrode configured to generate an electric field between the positive electrode and the negative electrode with an electric charge from the electrical power source and discharge the electric charge through a downhole formation; and at least two sensors configured to detect quantum particles or information about the quantum particles dislocated from the downhole formation by at least one of the electric field and the discharged electric charge to determine downhole information from at least one of a travel time of the quantum particles, a composition of the quantum particles, a quantity of the quantum particles, a charge of the quantum particles, and a change in dimensional space;

wherein the at least two sensors include a first sensor configured to interpret the quantum particles in a plasma zone and a second sensor configured to interpret the quantum particles in a high energy zone wherein the quantum particles in the high energy zone have an energy that is less than an energy of the quantum particles in the plasma zone.

2. The downhole tool of claim 1, wherein at least one sensor of the at least two sensors is positioned within at least one of the positive electrode and the negative electrode.

3. The downhole tool of claim 1, wherein at least one sensor of the at least two sensors comprises a sensor chosen from gas-detectors, solid-state-detectors, oxygenated silicon, PIN diodes, CVD-diamond detectors, and superconducting quantum interference devices.

4. The downhole tool of claim 1, wherein at least one sensor of the at least two sensors is positioned within the downhole formation.

5. The downhole tool of claim 1, wherein at least one sensor of the at least two sensors is positioned on a drill string coupled to the downhole tool.

6. The downhole tool of claim 1, wherein the at least two sensors comprise at least three sensors wherein a third sensor is configured to interpret the quantum particles in a low energy zone, wherein the quantum particles in the low energy zone have an energy that is lower than the energy of the quantum particles in the high energy zone.

7. The downhole tool of claim 1, wherein the downhole information determined is a characteristic of the downhole formation adjacent to the downhole tool.

8. The downhole tool of claim 7, wherein the downhole information determined is a characteristic of the downhole formation ahead of the downhole tool.

9. The downhole tool of claim 7, wherein the characteristic of the formation adjacement to the downhole tool is chosen from at least one of a density, a porosity, a resistivity, a magnetic resonance, a formation pressure, and a composition of the formation.

10. An electric impulse drilling system comprising:

a drill string;

a bottom hole assembly (BHA) coupled to the drill string, the BHA comprising:

a motor configured to rotate;

a power generator configured to generate electrical power from the rotation of the motor;

a high voltage generator configured to generate a high voltage from the electrical power generated by the power generator;

at least two electrodes configured to discharge the high voltage from the high voltage generator through a downhole formation; and one or more quantum particle or quantum particle information detectors disposed within a port extending inwardly from a face of at least one of the at least two electrodes configured to interpret quantum particles displaced from the downhole formation by the discharge of the high voltage through the downhole formation.

11. The electric impulse drilling system of claim 10, wherein at least one of the one or more quantum particle or quantum particle information detectors is disposed within the port extending inwardly from a forward face of at least one of the at least two electrodes, wherein the forward face is configured to contact the downhole formation.

12. The electric impulse drilling system of claim 11, wherein one or more rear quantum particle or quantum particle information detectors are disposed on a position behind the quantum particle information detectors disposed within the port extending inwardly from the forward face.

13. The electric impulse drilling system of claim 12, wherein a distance defined between the quantum particle information detectors disposed within the port extending inwardly from the forward face and the one or more rear quantum particle or quantum particle information detectors is used to determine at least one of a quantum particle speed, a quantum particle direction, a position of a quantum particle source or a type of quantum particle.

14. The electric impulse drilling system of claim 10, wherein at least one of the quantum particle or quantum particle information detector is located in the drill string in a position behind the BHA.

15. The electric impulse drilling system of claim 10, further comprising at least two communication networks comprising a low voltage communication network and a high voltage communication network.

16. The electric impulse drilling system of claim 10, wherein the high voltage generated by the high voltage generator is between about 200 kilovolts (kV) and about 900 kV.

* * * * *